A. J. LEWIS.
METHOD OF ASSEMBLING SPRINGS IN FASTENER MEMBERS.
APPLICATION FILED JUNE 13, 1919.
1,357,176. Patented Oct. 26, 1920.
Fig. 1
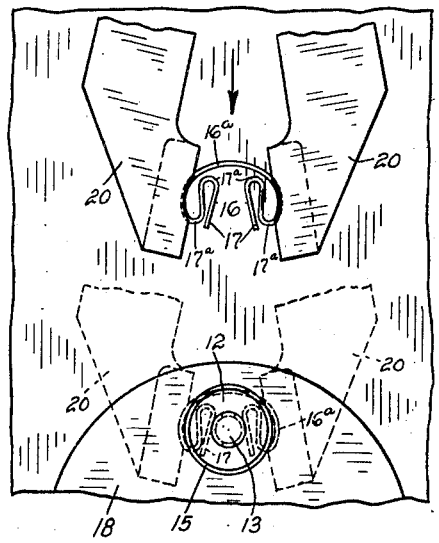
Fig. 2
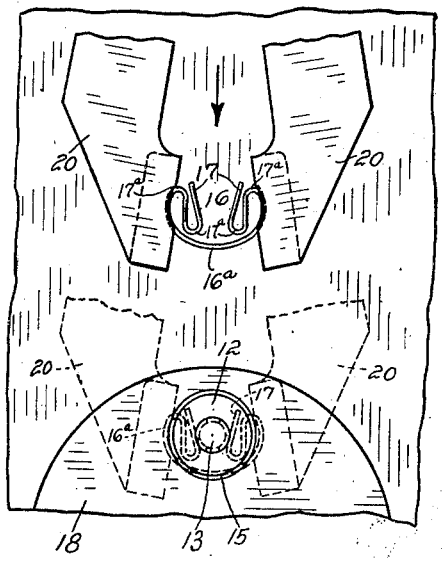
Fig. 3
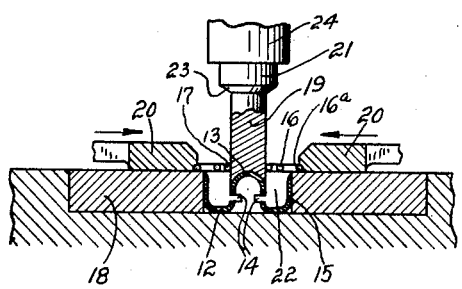
Fig. 4
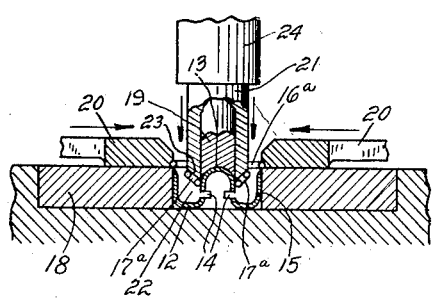
Fig. 5
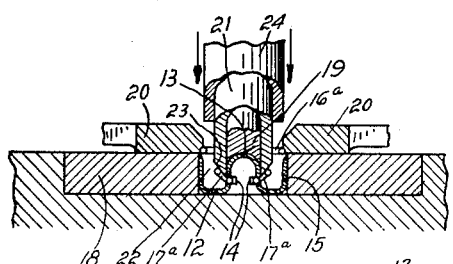
Fig. 6
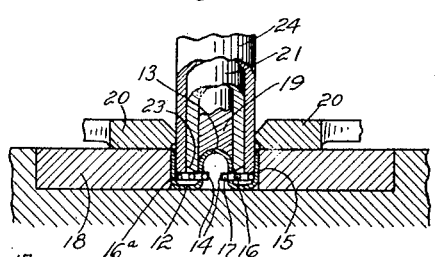
Fig. 7
INVENTOR
Arthur J. Lewis
BY
ATTORNEY

UNITED STATES PATENT OFFICE.

ARTHUR J. LEWIS, OF STRATFORD, CONNECTICUT.

METHOD OF ASSEMBLING SPRINGS IN FASTENER MEMBERS.

1,357,176. Specification of Letters Patent. Patented Oct. 26, 1920.

Application filed June 13, 1919. Serial No. 303,916.

*To all whom it may concern:*

Be it known that I, ARTHUR J. LEWIS, a citizen of the United States, residing at Stratford, county of Fairfield, State of Connecticut, have invented an Improvement in Methods of Assembling Springs in Fastener Members, of which the following is a specification.

This invention relates to the manufacture of the socket members of snap fasteners, so called, the socket members of which are provided with wire springs of peculiar formation which lock the shanks of the other fastener members in engagement with said socket members.

In Letters Patent No. 1,305,132, granted to me May 27, 1919, is disclosed an improved method of forming the wire springs employed in snap fastener socket members of the type above referred to, and for inserting said springs into said socket members, and the present invention relates particularly to improvements in the latter step of the process, namely, that of assembling the springs in the fastener members.

The more particular objects of the invention will best be understood from the following explanation of one mode of carrying the same into effect, reference being had to the accompanying drawings in which:

Figures 1 and 2 are diagrammatic plan views, and Figs. 3, 4, 5, and 6 are sectional views, illustrating different steps in the process of inserting a spring into a fastener member.

Fig. 7 is an enlarged plan view of the complete fastener member.

While the method constituting the present invention may be employed in inserting springs into other small spring receiving articles, the same has more particular reference to the introduction of springs into snap fastener socket members of the type shown in Fig. 7. A socket member of this type comprises a sheet metal disk 12 having a central hollow stud 13 constituting the socket proper and provided with diametrically opposite slots 14, said disk having an upwardly turned peripheral edge portion or flange 15 inclosing a wire spring 16, it being understood that, after the insertion of said spring, the edge 15 may be bent downwardly thereover to retain the same in place. The spring 16 is of a roughly semi-circular form, having an outer coil 16ᵃ engaging the edge 15 of the fastener member, the ends of said coil being bent inwardly and outwardly upon themselves to form a series of convolutions 17ᵃ, and the free terminals 17 thereof being, in the completed fastener, adapted to enter laterally the slots 14 of the central stud 13.

Preferably, and as disclosed and claimed in my copending application filed May 31, 1919, Serial No. 301,014, the springs 16 are initially formed with their outer coils 16ᵃ somewhat flatter than the form assumed when the spring is in its final position in the fastener member, the spring as a whole being consequently of a slightly elliptical form with a major diameter somewhat exceeding the diameter of the fastener member into which it is to be inserted, as will be clear from a comparison of Figs. 1 and 7, so that the expanded spring must be compressed slightly when the same is inserted into the fastener (such compression, however, being insufficient to exceed the elastic limit of the spring), such spring being thereafter retained in the device under a permanent resilient compression, which not only serves to resist accidental dislodgment of the spring from the fastener member, but increases the effective strength of the terminals 17, causing them to perform their intended function with increased reliability.

It will be observed that in order to insert a spring of the form shown into a socket member of the character under consideration, it is necessary to compress the terminals 17 outwardly in order to permit the same to pass over the central stud 13 and snap into place in the slots 14. It therefore follows that said terminals 17, as also the several convolutions 17ᵃ, must, during the insertion of the spring, pass through the somewhat restricted annular space 22 between the central stud 13 and the peripheral edge 15. It will also be noted that, when the spring is inserted, the outer coil thereof must be confined within the periphery of the socket member, and where an over-size spring is employed the outer coil thereof must be compressed inwardly to within the compass of the socket member. If the inward compression of the outer coil of the spring and the outward compression of the terminals 17 thereof take place simultaneously, and the entire spring is crowded at once into the restricted annular space 22, it will be seen that the convolutions 17ᵃ will be subjected to a considerable strain which may be so excessive as to result in a permanent set, materially impairing the efficiency of the device. In order to avoid this difficulty, and as disclosed and more broadly claimed in my copending application filed May 31, 1919, Serial No. 301,011, the spring as a whole is not forced into the socket member all at once, but the terminals 17 are preferably first inserted into the fastener member and about the stud 13, the outer coil 16ª being at this time fully expanded or under only slight compression, and thereafter, the outer coil is compressed and forced into place in engagement with the peripheral edge 15 of the fastener, the terminals 17 being at this time free to expand downwardly into the fastener and laterally into the slots 14. In this manner it will be seen that the insertion of the several parts of the spring may be caused to take place successively instead of simultaneously, thereby avoiding excessive strain upon the spring.

In accordance with the present invention, the foregoing operations are performed as follows.

The fastener member 12 into which a spring is to be inserted is held in any suitable work-holding device, as, for example, a bed or carrier plate 18 having a recess to receive said fastener. A spring 16 in expanded condition is held between a pair of suitably formed plier or other jaws 20 (which jaws may be either mechanically or manually operated) and said jaws moved in the direction of the arrows on Figs. 1 and 2 to bring said spring immediately over said socket member as shown in dotted lines in said figures. With the spring in the expanded condition shown, the terminals 17 are separated by a distance approximately equal to the diameter of the central stud 13. A suitable mandrel 19 of substantially the same diameter as the central stud 13, and preferably provided with a recessed end to fit the head of said stud, is placed thereover, as shown in Fig. 3. As shown in Fig. 1, and as also disclosed and more broadly claimed in my prior application filed May 31, 1919, Serial No. 301,013, the mandrel 19 may be first applied to the stud 13 and the spring 16 moved about said mandrel with its open side foremost, the terminals 17 during this movement passing on opposite sides of the mandrel. Preferably, however, and as shown in Fig. 2 and more broadly claimed in my prior application filed May 31, 1919, Serial No. 301,012, the spring 16 is moved by the jaws 20 with the outer coil 16ª foremost over the socket member, and the mandrel 19 thereafter inserted between the terminals 17 into engagement with the head of the stud 13. In either case, after the spring and mandrel have been properly positioned, the inner terminals 17 are forced downwardly from the mandrel and about the stud 13 at opposite sides thereof. This operation may conveniently be performed by means of an annular tool or plunger 21 of an interior diameter corresponding approximately to the exterior diameter of the mandrel 19, said implement being moved downwardly between the jaws 20, as shown in Fig. 4. Coincident with or closely following the descent of the implement 21, the jaws 20 may be moved toward one another to compress the outer coil 16ª of the spring, as indicated by the arrows on Fig. 4. The end of the implement 21 is preferably beveled, as indicated at 23, so that, as said implement forces the terminals 17 and convolutions 17ª downwardly, said convolutions will assume the inclined position shown in Figs. 4 and 5. The compression of the outer coil 16ª, therefore, will not result in crowding the parts between the stud 13 and flange 15, but will tend to assist in forcing the terminals 17 downwardly about the stud 13 and into position to enter the slots 14. During the inward movement of the jaws 20 and the compression of the outer coil of the spring, the implement 21 is held in its depressed position to hold the terminals and convolutions of the spring in the position above referred to. When the jaws 20 have compressed the outer coil 16ª into a sufficiently small compass to be received within the flange 15, said outer coil may be forced downwardly into the socket member, this operation being permitted without undue strain upon the spring by the expansion of the terminals 17 into the slots 14, as shown in Figs. 5 and 6. The operation last referred to may be conveniently performed by means of a second annular tool or implement 24 of an interior diameter corresponding approximately to the exterior diameter of the implement 21, and of an exterior diameter approximately equal to the inside diameter of the flange 15, said tool being moved downwardly over the implement 21, as indicated by the arrows on Fig. 5, and between the jaws 20, to force the spring downwardly from said jaws and into the socket member, as shown in Fig. 6, without permitting expansion of said spring until it is substantially in place.

By forcing the spring into the socket member over the mandrel 19, the inner terminals of said spring are accurately guided into position, so that the insertion of the spring is greatly facilitated and may be greatly expedited, while by employing different implements to force the inner and outer portions of the spring respectively into place, one of said implements being also used to hold the inner portions of the spring in place while the outer portion thereof is being inserted by the other implement, the operation may be carried out with such precision as to eliminate any possibility of injury to the spring or improper positioning thereof.

Having thus described my invention, I claim:

1. The herein described method of inserting springs having inner and outer portions into spring receiving articles having central studs, which consists in holding a spring about a mandrel held in engagement with the central stud of an article to receive said spring, forcing the inner portion of said spring from said mandrel into said article by means of a suitable implement, holding said inner portion in place with said implement, and forcing the outer portion of said spring into said article by means of a separate implement.

2. The herein described method of inserting springs having inner and outer portions into spring receiving articles having central studs, which consists in holding a spring about a mandrel held in engagement with the central stud of an article to receive said spring, applying an annular implement over said mandrel to force the inner portion of said spring from said mandrel into said article, and applying a second annular implement over said first named implement to force the outer portion of said spring into said article.

3. The herein described method of inserting springs having inner and outer portions into spring receiving articles having central studs, which consists in providing a spring of an initially greater dimension than the corresponding dimension of the article to receive it, holding said spring about a mandrel held in engagement with the central stud of said article, forcing the inner portion of said spring from said mandrel into said article by means of a suitable implement, holding said inner portion in place with said implement, compressing the outer portion of said spring to within the compass of said article, and forcing said compressed outer portion into said article by means of a separate implement.

4. The herein described method of inserting springs having inner and outer portions into spring receiving articles having central studs, which consists in providing a spring of an initially greater dimension than the corresponding dimension of the article to receive it, holding said spring about a mandrel held in engagement with the central stud of said article, applying an annular implement over said mandrel to force the inner portion of said spring from said mandrel into said article, compressing the outer portion of said spring to within the compass of said article, and applying a second annular implement over said first named implement to force said compressed outer portion into said article.

5. The herein described method of inserting springs having outer coils and free inner terminals into spring receiving articles having outer edge portions coöperating with the outer coils of said springs and central studs having slots to receive the inner terminals of said springs, which consists in holding a spring about a mandrel held in engagement with the central stud of an article to receive said spring, forcing the inner terminals of said spring from said mandrel into said article and into positions to enter said slots by means of a suitable implement, holding said inner terminals in place with said implement, and forcing the outer coil of said spring into its operative position with respect to the outer edge portion of said article by means of a separate implement.

6. The herein described method of inserting springs having outer coils and free inner terminals into spring receiving articles having outer edge portions coöperating with the outer coils of said springs and central studs having slots to receive the inner terminals of said springs, which consists in holding a spring about a mandrel held in engagement with the central stud of an article to receive said spring, applying an annular implement over said mandrel to force the inner terminals of said spring from said mandrel into said article and into positions to enter said slots, and applying a second annular implement over said first named implement to force the outer coil of said spring into its operative position with respect to the outer edge portion of said article.

7. The herein described method of inserting springs having outer coils and free inner terminals into spring receiving articles having outer edge portions coöperating with the outer coils of said springs and central studs having slots to receive the inner terminals of said springs, which consists in providing a spring having an outer coil of initially greater diameter than the diameter of the article to receive it, holding said spring about a mandrel held in engagement with the central stud of said article, forcing the inner terminals of said spring from said mandrel into said article and into positions to enter said slots by means of a suitable implement, holding said inner terminals in place with said implement, compressing the outer coil of said spring to a diameter substantially corresponding to the diameter of said article, and forcing the outer coil of said spring into its operative position with respect to the outer edge portion of said article by means of a separate implement.

8. The herein described method of inserting springs having outer coils and free inner terminals into spring receiving articles having outer edge portions coöperating with the outer coils of said springs and central studs having slots to receive the inner terminals of said springs, which consists in providing a spring having an outer coil of initially greater diameter than the diameter of the article to receive it, holding said spring about a mandrel held in engagement with the central stud of said article, applying an annular implement over said mandrel to force the inner terminals of said spring from said mandrel into said article and into positions to enter said slots, compressing the outer coil of said spring to a diameter substantially corresponding to the diameter of said article, and applying a second annular implement over said first named implement to force the outer coil of said spring into its operative position with respect to the outer edge portion of said article.

In testimony whereof I affix my signature.

ARTHUR J. LEWIS.